US005491606A

United States Patent [19]

Hesterman et al.

[11] Patent Number: 5,491,606

[45] Date of Patent: Feb. 13, 1996

[54] PLANAR MAGNETORESISTIVE HEAD WITH AN IMPROVED GAP STRUCTURE

[76] Inventors: Victor W. Hesterman, 12715 Canario Way, Los Altos Hills, Calif. 94022; Manoj K. Bhattacharyya, 1650 Heron Ave., Sunnyvale, Calif. 94087

[21] Appl. No.: 410,382

[22] Filed: Mar. 27, 1995

Related U.S. Application Data

[63] Continuation of Ser. No. 146,255, Nov. 1, 1993, abandoned.

[51] Int. Cl.$^6$ .................................. G11B 5/39; G11B 5/23

[52] U.S. Cl. .................................. 360/113; 360/119

[58] Field of Search .................................. 360/113, 119, 360/122, 125, 126

[56] References Cited

U.S. PATENT DOCUMENTS

| | | | |
|---|---|---|---|
| 4,356,523 | 10/1982 | Yeh | 360/113 |
| 4,400,752 | 8/1983 | Chabrolle | 360/113 |
| 4,626,946 | 12/1986 | Vinal | 360/113 |
| 4,698,711 | 10/1987 | Vinal | 360/113 |
| 4,757,410 | 7/1988 | Seko et al. | 360/113 |
| 4,907,115 | 3/1990 | Ruigrok et al. | 360/113 |
| 4,949,039 | 8/1990 | Grünberg | 324/252 |
| 4,949,207 | 8/1990 | Lazzari | 360/119 |
| 4,983,945 | 1/1991 | Becker et al. | 360/113 |
| 5,206,590 | 4/1993 | Dieny et al. | 324/282 |
| 5,208,716 | 5/1993 | Lazzari | 360/113 |
| 5,274,520 | 12/1993 | Matsuzono et al. | 360/113 |
| 5,274,521 | 12/1993 | Miyauchi et al. | 360/113 |

FOREIGN PATENT DOCUMENTS

| | | | |
|---|---|---|---|
| 0221540A3 | 5/1985 | European Pat. Off. | G11B 5/39 |
| 0325365A2 | 7/1989 | European Pat. Off. | G11B 5/39 |
| 0326192A3 | 8/1989 | European Pat. Off. | G11B 5/39 |
| 0467737A1 | 1/1992 | European Pat. Off. | G11B 5/49 |
| 0475397A3 | 3/1992 | European Pat. Off. | G11B 5/31 |
| 0539213A1 | 4/1993 | European Pat. Off. | H01L 43/10 |
| 62-134814 | 6/1987 | Japan | G11B 5/39 |
| 088911 | 4/1989 | Japan | G11B 5/31 |
| 6131635 | 5/1994 | Japan | G11B 5/39 |
| WO88/07741 | 10/1988 | WIPO | G11B 5/39 |

OTHER PUBLICATIONS

Bhattacharyya et al., "Bias Scheme Analysis of Shielded MR Heads for Rigid Disk Recording", J. Appl. Phys. 61(8), 15 Apr. 1987, pp. 4167–4169.

Tsang et al., "Gigabit Density Recording Using Dual–Element MR/Inductive Heads on Thin–Film Disks", IEEE Transactions on Magnetics, vol. 26, No. 5, Sep. 1990, pp. 1689–1693.

Berkowitz et al., "Giant Magnetoresistance in Heterogenous Cu–Co Alloys", Physical Review Letters, vol. 68, No. 25, 22 Jun. 1992, pp. 3745–3748.

J. M. Daughton et al., "GMR Materials for Low Field Applications", IEEE Transactions on Magnetics, vol. 29, No. 6, Nov. 1993, pp. 2705.

G. Xiao et al., "Giant Magnetoresistance and Anomalous Hall Effect in Co–Ag and Fe–Cu, Ag, Au, Pt Granular Alloys", IEEE Transactions on Magnetics, vol. 29, No. 6, Nov. 1993, p. 2694.

*Primary Examiner*—John H. Wolff
*Assistant Examiner*—Craig A. Renner

[57] ABSTRACT

Providing a magnetic head with a yoke and a gap structure coupled to a substrate that is positioned above a magnetic medium. The gap structure includes one or more lips, a first and a second ferromagnetic pole, and a magnetoresistive element (MRE). The magnetoresistive element is removed from the air-bearing surface of the magnetic head. For the embodiment with two lips, the two lips define a head gap. Each ferromagnetic pole is connected to one lip. The two poles are separated by a distance greater than the length of the gap, and each pole has a thickness that is greater than the thickness of each lip. The MRE is substantially coupled magnetically, but not electrically to the two poles at a location where the two poles are separated by a distance greater than the length of the gap.

17 Claims, 4 Drawing Sheets

101 102 105 106 100 104 116 112 108 114 122 124 102A 160A 158A 176A 162 158B 176B 160B 121 172 154B 154A 122 124 156A 192 156B 150 190 164 152 Y X Z 166 168 182 184 189 186 188

PLANAR MAGNETORESISTIVE HEAD WITH AN IMPROVED GAP STRUCTURE

CROSS-REFERENCE TO RELATED APPLICATION(S)

This is a continuation of application Ser. No. 08/146,25 filed on Nov. 1, 1993, now abandoned.

BACKGROUND OF THE INVENTION

The present invention relates generally to magnetic heads and more particularly to a planar magnetoresistive head. There is a constant push to increase the density of recorded information on a magnetic medium. As the density increases, the magnetic head for reading and writing information into the medium has to be scaled down correspondingly. Different methods have been used to scale down the magnetic head. A constant theme is to reduce the size of a head gap but still maintain the signal-to-noise ratio of the head. The head gap is a gap positioned on an air-bearing surface (ABS) above the magnetic medium, for exciting and sensing magnetic transitions in the medium.

One prior art method uses a magnetoresistive element (MRE) with one of its edges at the ABS for sensing the magnetic signals from the magnetic medium. Unfortunately, the configuration exposes the MRE to wear and corrosion. Moreover, the MRE usually exhibits asymmetric cross-track profiles, as described in "Gigabit Density Recording Using Dual-Element MR/Inductive Heads on Thin-Film Disks," written by Tsang et. al. and published in the IEEE Transactions on Magnetics, Volume 26, No. 5, in September 1990. Various attempts have been made to move the MRE away from the ABS and to correct for the asymmetry.

One prior art method moves the MRE away from the ABS by bridging the MRE across the two arms of a magnetic yoke in a dual track head. The magnetic yoke with a write coil is for writing, and the MRE is for reading information. In this method, a thin-film ferromagnetic material is deposited on a substrate as the yoke, and then a thin-film Nan-Yeh type MERE is deposited away from the head gap of the yoke. Since the structure is in thin-films, relatively high reluctance paths are created from the head gap to the MRE. In this method, the yoke has a back gap to decrease the leakage flux in the yoke during the read operation. However, such a structure increases the susceptibility of the head to the stray magnetic flux in the vicinity of the head. To reduce the effect of the stray flux, magnetic shields are added. On the other hand, the shields, due to their proximity to the thin-film yoke and the MRE, increase the leakage flux. Both the high reluctance paths and the shields decrease the reading sensitivity.

Another prior art method scales down the head gap in a silicon planar head and then places an MRE across the gap on the side opposite to the ABS so as to move the MRE away from the ABS. However, as the head gap is decreased in size for high resolution, the leakage flux through the head gap increases significantly. Moreover, stray magnetic flux tends to go through the MRE increasing noise during reading. The increase in the leakage flux and the stray magnetic flux again decreases the reading sensitivity.

It should be apparent from the foregoing that there is still a need for a magnetic head without the aforementioned problems for high density recording.

SUMMARY OF THE INVENTION

The present invention provides a planar magnetic head for reading and writing information in a high density magnetic medium. It combines the benefits of the high sensitivity needed for reading, and the high magnetic field needed for writing information. Moreover, the present invention reduces the problems of leakage magnetic flux, high series reluctance, and noise due to stray magnetic flux.

In one preferred embodiment, the magnetic head includes a ferromagnetic yoke and a gap structure, both fabricated on a substrate. The gap structure includes a first lip, a first and a second ferromagnetic pole, and an MRE bridging the two poles.

The first lip is adjacent to a head gap. The head gap has a gap length.

The first ferromagnetic pole is connected to the lip. The two poles are separated by a distance greater than the gap length, and each pole has a thickness that is greater than the thickness of the lip. The small head gap improves the resolution in reading the magnetic medium, while the greater separation between the two poles minimizes the leakage magnetic flux across the poles.

The MRE bridges the two poles magnetically, but not electrically, at a location where the two poles are separated by a distance greater than the gap length. The greater separation increases the length of the MRE, which in turn increases the reading sensitivity.

The ferromagnetic yoke has a first end, which is separated from the first pole by a first side gap. The first side gap reduces stray magnetic flux in the MRE because a lower reluctance path exists through the yoke than through the side gap.

Other aspects and advantages of the present invention will become apparent from the following detailed description, taken in conjunction with the accompanying drawings, illustrating by way of example the principles of the invention.

Same numerals in FIGS. 1–4 are assigned to similar elements in all the figures. Embodiments of the invention are discussed below with reference to FIGS. 1–4. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
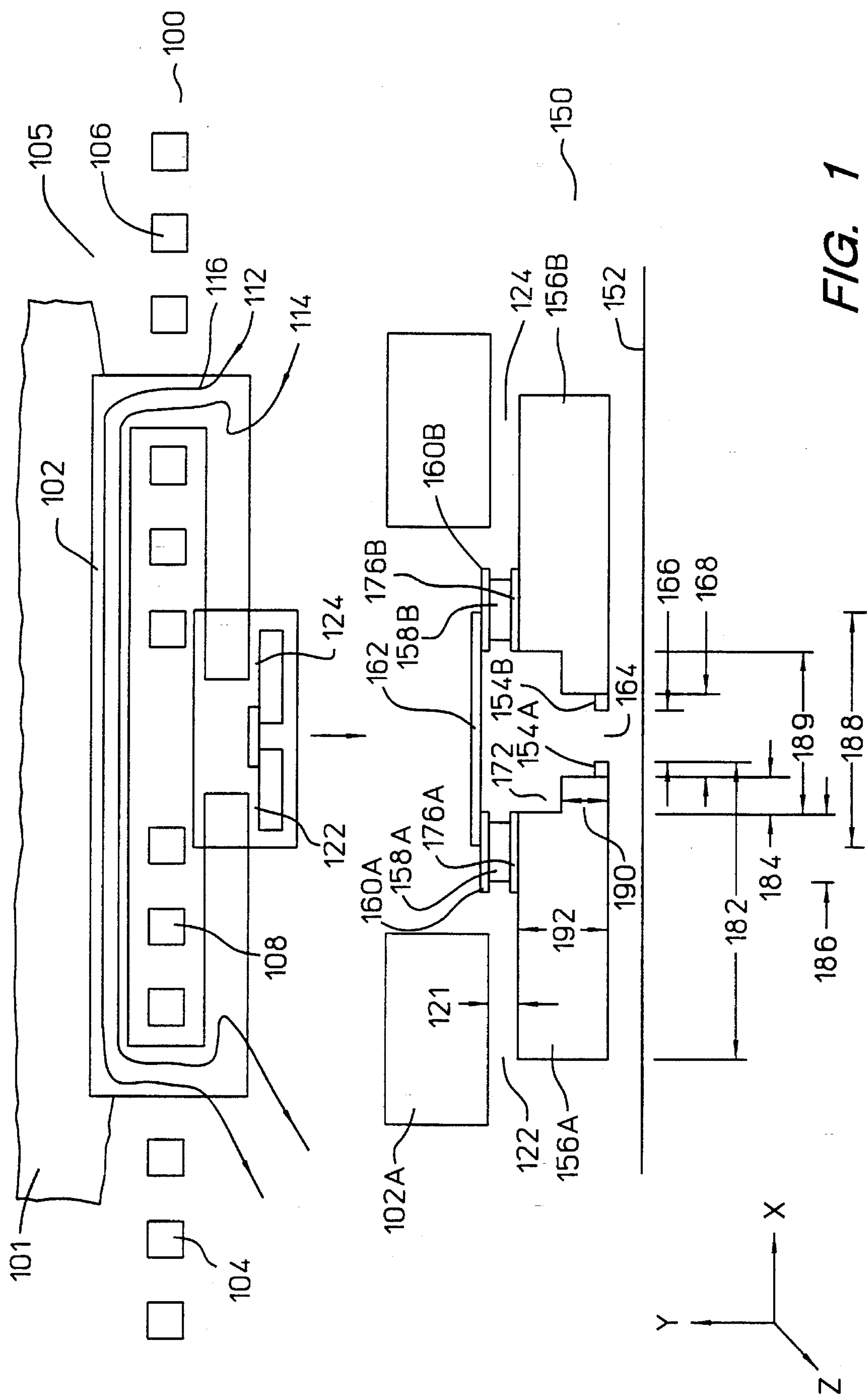
FIG. 1 illustrates a cross-sectional view of a portion of the first preferred embodiment of the present invention.

FIG. 1 shows a cross-sectional view of a portion of the first preferred embodiment 100 of the invented planar magnetic head. The magnetic head is built on a substrate 101, such as silicon. Similar process steps to make the invention, which is not detailed here, are well-known to those skilled in the art, and are described, for example, in U.S. Pat. No. 4,949,207, titled "Planar Structure Thin Film Magnetic Head," by Jean-Pierre Lazzari, which is hereby incorporated by reference.

The invented magnetic head has important low cost advantages, such as fabrication by standard semiconductor processing techniques without the need for grinding or dicing, which are required to fabricate some prior art magnetic heads.

In the preferred embodiment, the magnetic head 100 includes a gap structure 150 and a yoke 102. Typically, the head 100 is fabricated from the top down, which means that the yoke 102 is built before the gap structure 150. The yoke 102 is a high permeability ferromagnetic material. Turns of conductor, such as 104, 106 and 108, wrap around the yoke 102 to form a write coil 105. Currents flowing in the write coil 105 generate magnetic flux through the yoke 102.

The yoke is separated from the gap structure 150 by one or more side gaps, such as 122 and 124. In the first embodiment, there are two side gaps, but in another preferred embodiment of the magnetic head, there can be just one side gap. The side gap is filled by a nonmagnetic material such as silicon dioxide. With the one or more side gaps, the low reluctance yoke guides a significant amount of the stray magnetic flux, such as 112 and 114, away from the gap structure 150. This preferential guiding path exists because the stray magnetic flux tends to go through the lower reluctance paths of the ferromagnetic yoke, such as 116, instead of the higher reluctance path through the side gap.

The gap structure includes one or more ferromagnetic lips, such as 154A, 154B, a first and a second ferromagnetic pole, 156A, 156B, a first and a second ferromagnetic lead, 158A, 158B, and a MRE, 162.

In the first embodiment, there are two lips. The pair of lips 154A, 154B, define a head gap 164. The head gap has a gap length 166, which is measured along the x-direction, as shown in the Figure. In another preferred embodiment, there is only one lip. The lip and the first ferromagnetic pole defines the head gap.

In the first embodiment, the two ferromagnetic poles should preferably have low reluctance. One ferromagnetic pole is connected to one lip, such as the pole 156A connected to the lip 154A. The two poles are separated by a distance greater than the gap length, 166; for example, the poles are separated at least by the distance 168. Each pole also has a thickness that is greater than the thickness of each lip, as shown in FIG. 1.

The small head gap 164 improves the resolution in reading the magnetic medium, while the greater separation between the two poles minimizes the magnetic leakage flux across the poles. The loss in signal level due to leakage should be minimized to preserve the signal-to-noise ratio at high recording densities. The noise due to stray magnetic flux, such as 112, should also be minimized. The importance of the side gap increases as the gap length 166 decreases. High stray magnetic flux, such as 112, may create considerable noise in the MRE if the flux is not directed away from the MRE by the side gap.

The MRE 162 bridges magnetically, but not electrically, the two poles at a location where the two poles are separated by a distance greater than the gap length 166. When the head gap 164 is in close proximity to the magnetic medium 152, most of the magnetic flux from the medium propagates through one of the poles to the other pole via the MRE. Only a minimum amount of flux propagates to the yoke because the poles 156A and 156B are separated from the yoke 102 by one or more side gaps. One additional benefit of locating the MRE at a position with a distance greater than the gap length 166 is that the active length 189 of the MRE increases. The active length 189 of the MRE 162 is substantially equal to the length of the MRE suspended between the two poles. A greater active length usually leads to a higher reading signal level.

Different types of MRE can be used. One example is a patterned Nickel-Iron thin-film. In the first embodiment, the MRE is of the type invented by Nan-Yeh, and described in the U.S. Pat. No. 4,356,523, titled, "Narrow Track Magnetoresistive Transducer Assembly," which is hereby incorporated by reference. The Nan-Yeh MRE consists of two thin ferromagnetic films separated by a thin non-ferromagnetic layer. It is inherently quite stable and is relatively free from Barkhausen noise. The Nan-Yeh MRE also allows a sense current to flow along its active length to sense its change in resistance when the head is reading. This is beneficial because the MRE can be made quite long along the x-direction to increase its overlap with the poles, which, in turn, reduces the reluctance between the poles and the MRE.

Another preferable material for the MRE 162 is a giant magnetoresistive element (GMRE) as described, for example, in the following three references; the first reference is the U.S. Pat. No. 5,206,590, titled, "Magnetoresistive Sensor Based on the Spin Valve Effect," invented by Dieny et. al. for a spin-valve type GMRE; the second reference is the U.S. Pat. No. 4,949,039, titled, "Magnetic Field Sensor With Ferromagnetic Thin Layers Having Magnetically Antiparallel Polarized Components," invented by Grinberg for a multi-layer based GMRE; and the third reference is written by Berkowitz et. al. for a granular material GMRE, titled, "Giant Magnetoresistance in Heterogeneous Cu-Co Alloys," published in the Physical Review Letters volume 68, pages 3745–8 in 1992. The three references on GMRE are all incorporated by reference.

In the first preferred embodiment, there are additional notches or chamfers or other curved structures in the poles to increase the separation between the poles. FIG. 1 shows one additional notch in each pole, such as 172 in the pole 156A. The notches in the poles further extend the separation between the two poles. This extension further decreases the leakage flux between the poles, and increases the active length, 189, of the MRE, which in turn increases the reading sensitivity.

The lips and the poles with notches are preferably made by standard photolithographic techniques. Those techniques should be obvious to those with ordinary skill in the art, and will not be further described in this application.

The ferromagnetic leads, 158A and 158B, are interposed between the MRE 162 and the two poles, 156A and 156B. The two leads, one on each end of the MRE, allow a sense current to pass through the MRE for reading information from the magnetic medium 152. The leads are preferably made of a ferromagnetic material with high permeability to decrease the reluctance between the poles and the MRE. To further reduce the reluctance, each lead should occupy a substantial area in proximity with one of the poles.

In another preferred embodiment, the leads are positioned above the MRE, rather than between the MRE and the poles. In this configuration, the leads can be made of a nonmagnetic material.

In order to isolate the sense current from the two poles, 156A and 156B, preferably, there is a thin electrically insulating layer between the MRE 162 and each pole, such as the layer 176A between the lead 158A and the pole 156A, and the layer 176B between the lead 158B and the pole 156B.

In the first preferred embodiment, the MRE 162 is separated from the ferromagnetic leads by thin non-ferromagnetic metal films; for example, the first lead 158A is separated from the MRE 162 by a first thin non-ferromagnetic film 160A, and the second lead 158B from the MRE 162 by the second thin non-ferromagnetic film 160B. The two thin films substantially remove any ferromagnetic exchange between the leads and the MRE. In order to maintain electrical contact between the leads and the MRE, the thin films are electrically conductive. Moreover, to maintain low reluctance paths from the poles, 156A and 156B, to the MRE 162, the films should preferably be just thick enough to break ferromagnetic exchange.

Figure 2:
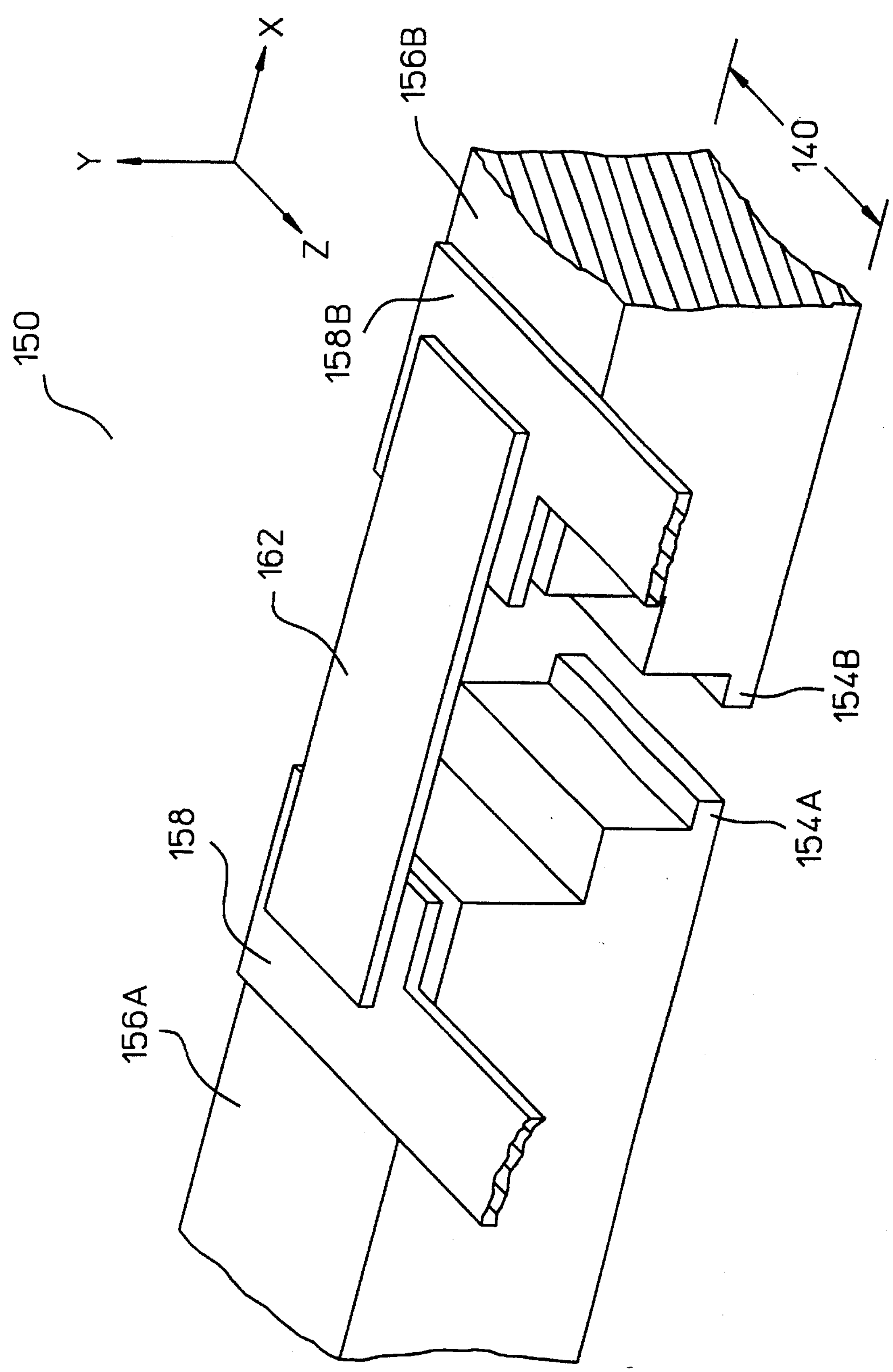
FIG. 2 illustrates a three-dimensional view of a part of the gap structure of the first preferred embodiment of the present invention.

FIG. 2 illustrates a three-dimensional view of a part of the gap structure 150 of the first preferred embodiment of the magnetic head 100. The head 100 has a track-width 140, which is along a cross-track direction or the z-direction.

In a normal read or write operation, the gap structure 150 is positioned above the magnetic medium 152, which moves along the track direction or the x-direction.

In the write operation, a write current is sent through the write coil 105 to generate the magnetic flux in the yoke 102 and the gap structure 150. The magnetic flux across the gap, 164, writes the information into the magnetic medium 152.

In the read operation, a sense current, I, is sent through the MRE. The resulting signal voltage is measured by Read channel electronics, not shown in the figure.

Figure 3A:
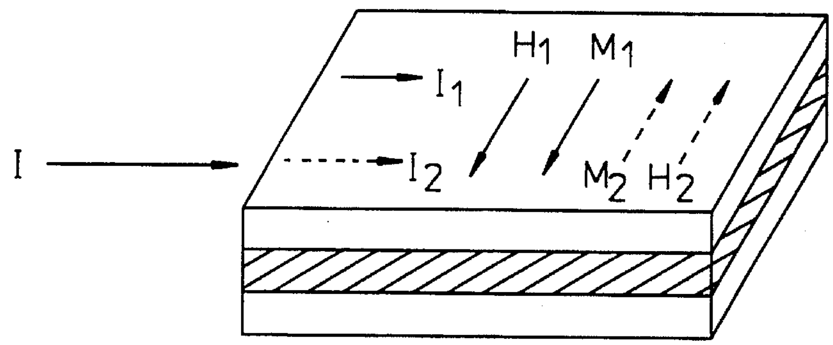
FIGS. 3A–C show the directions of the magnetization M in each magnetic film of the Nan-Yeh type MRE under different conditions in the present invention.
Figure 3B:
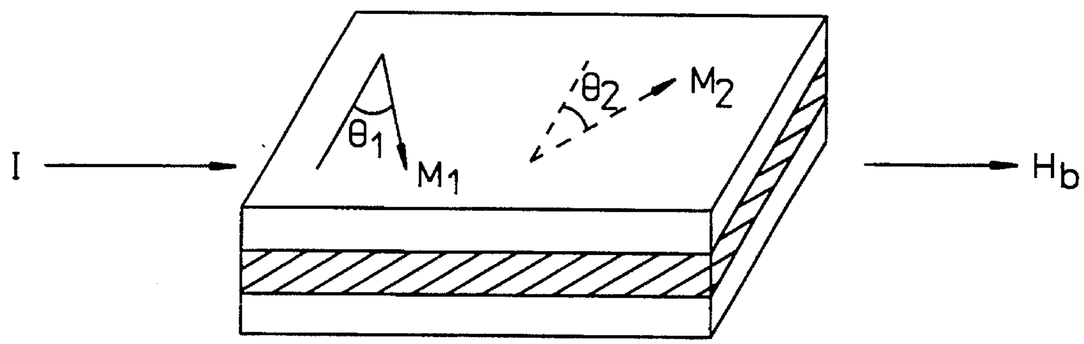
Figure 3C:
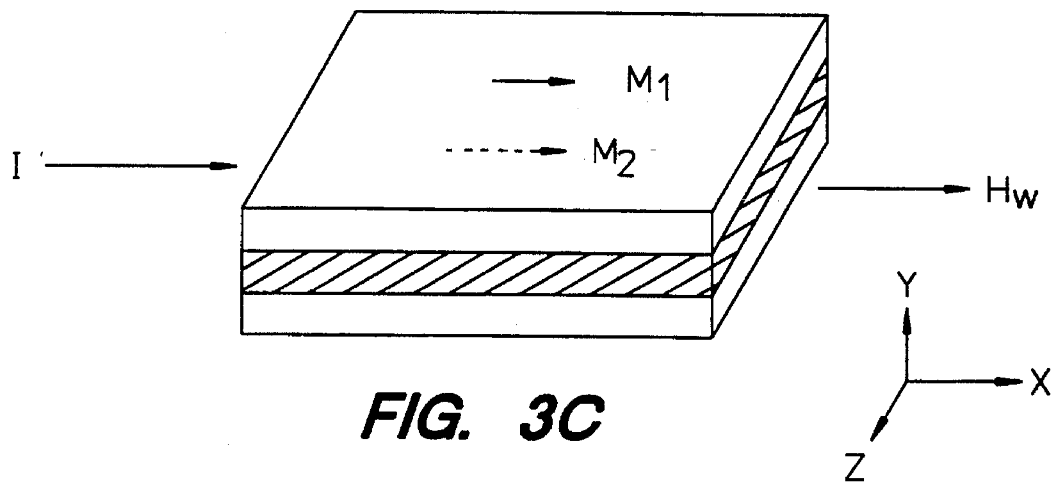

FIGS. 3A–C show the directions of the magnetization M in each magnetic film of the Nan-Yeh type MRE under different conditions, with the symbol H representing the externally applied fields. In FIGS. 3A–C, a subscript 1, with solid lines, designates the first film, and a subscript 2, with dashed lines, designates the second film. FIG. 3A shows the effect of the sense current on $M_1$ and $M_2$. FIG. 3B shows the effect of an additional bias current on $M_1$ and $M_2$, and FIG. 3C shows the directions of $M_1$ and $M_2$ during the write operation.

In FIG. 3A, the externally applied sense current I splits into $I_1$ and $I_2$ in the first and the second film, creating the magnetic fields $H_1$ and $H_2$ respectively. The combined effect of the magnetic fields and the magnetic anisotropy of the films generates a set of antiparallel $M_1$ and $M_2$, both pointing along the easy axis of the MRE or the z-direction. This magnetization configuration is a stable condition with good flux closure.

In FIG. 3B, in addition to the sense current, a bias current is applied to the write coil 105 to create a bias field $H_b$. This bias field rotates $M_1$ and $M_2$ from their antiparallel orientation to having a bias angle of $\theta_1$ and $\theta_2$ respectively. The bias angles increase the sensitivity of the MRE and should preferably be about 45 degrees. The bias current should take into account the anisotropy, the fields $H_1$ and $H_2$, the demagnetization effects due to the edges, and the remanence due to the previous write operation.

FIG. 3C shows the effect of the write current flowing in the write coil 105. The write current creates a large write field $H_w$. Due to the magnitude of the write field, $M_1$ and $M_2$ rotate to point approximately along the x-direction.

In the first preferred embodiment, the sense current I flows in the MRE during the termination of the write current. As the write current terminates, the magnetic fields, $H_1$ and $H_2$, from the sense current I, guide $M_1$ and $M_2$ back to their respective bias angle $\theta_1$ and $\theta_2$. Thus, the sense current I substantially prevents uncertain rotation of the $M_1$ and $M_2$. The sense current I also substantially prevents domain formation in the MRE, which, in turn, reduces Barkhausen noise in the subsequent read operation.

The sense current I is present during the read operation, and preferably during the termination of the write current. If desired, the sense current can flow all the time. Preferrably, the write current always terminates with the same polarity, so that the remanence is predictable, and the required bias current can be more accurately determined.

Figure 4:
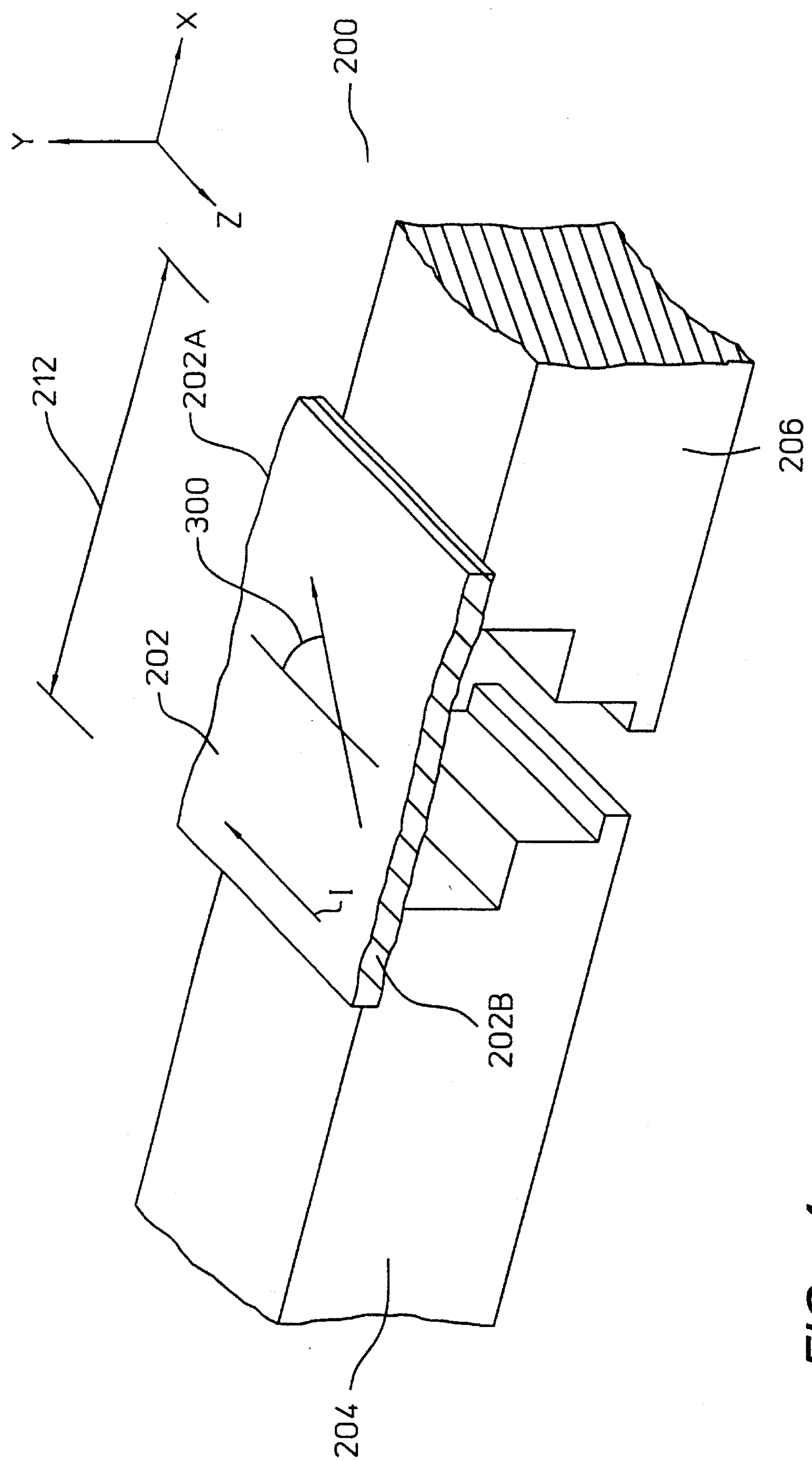
FIG. 4 shows a three-dimensional view of a part of the gap structure of another preferred embodiment of the present invention.

FIG. 4 shows a three dimensional view of a part of the gap structure 200 of a second preferred embodiment of the present invention. In this embodiment, the yoke and the side gaps are substantially similar to the first embodiment 100, and are not shown in the Figure. The MRE is preferably a single piece of ferromagnetic material, 202, electrically isolated from the first, 204, and the second, 206, ferromagnetic pole. This isolation can be achieved by a thin insulating layer between the MRE 202 and the poles, similar to the layer 176A in the first embodiment. The second embodiment does not need the first and the second ferromagnetic lead. The sense current flowing in the MRE 202 traverses from one end 202A to another end 202B of the MRE, along the z-direction, or along a small angle from the z-direction.

The easy axis of the MRE substantially points along the z-direction. A bias current flows in the write coil 105 to establish a bias magnetic field in the MRE. This bias magnetic field rotates the magnetization of the MRE to point along an angle 300, such as 45 degrees, from the z-direction. Other angles should be obvious to those skilled in the art, and are described in the reference titled, "Bias Scheme Analysis of Shielded MR Heads for Rigid Disk Recording," written by Bhattacharyya et. al. and published in the Journal of Applied Physics, Volume 61(8), in 1987, which is hereby incorporated by reference. Structually, the MRE 202 overlaps the poles, 204 and 206, to reduce the reluctance between the MRE and the poles. However, an excessive overlap along the x-direction reduces the signal level of a read operation.

WORKING EXAMPLES

The invention will be further clarified by a consideration of the following examples, which are intended to be purely exemplary of using the invention.

one example of the first embodiment has the following parameters: the yoke 102, the poles 156A and 156B, and the ferromagnetic leads 158A and 158B, are made of permalloy (NiFe); the insulating layers 176A and 176B are made of silicon dioxide; the thin non-ferromagnetic films 160A and 160B are made of tantalum; the MRE is the Nan-Yeh type; and the side gaps 122 and 124 are filled by silicon dioxide. The gap length 166 is about 0.2 micrometer or μm; the length 168 between the two poles is about 0.6 μm; the length 184 of each pole from its corresponding lip to the first notch is about 0.7 μm; the length 182 of each pole is about 7 μm; the length 186 of each ferromagnetic lead is about 4 μm; the length of each of the non-ferromagnetic films and each of the insulating layers is about 5 μm; and the length 188 of the MRE is about 3 μm. The thickness of each lip is about 0.1 μm; the thickness 190 of the first notch is about 1 μm; the thickness 192 of each pole is about 2 μm; the thickness of the insulating layer 176A is about 0.15 μm; the thickness of the ferromagnetic lead 158A is about 0.2 μm; the thickness of the non-ferromagnetic film 160A is about 4 nanometers or nm; the thickness of the MRE is about 0.05 μm; and the height 121 of the side gap 122 is about 0.75 μm. The overlap between the pole 156A and the end 102A of the yoke 102 is about 4 μm. The yoke 102 with its write coil is similar to those in Lazzari, supra, except that only about 10 turns are needed. The write current is about 400 mAt or milli-Ampere-turns; the sense current is about 15 mA; and the bias current is about 6 mAt. The above example is capable of writing and reading a magnetic medium with a track width 140 of about 2 μm, and an areal density of about 1 Gbit per square inch.

One example for the second embodiment shown in FIG. 4 has characteristics similar to the first embodiment except that the MRE is a single film of permalloy with its easy axis aligned parallel to the current; the width 212 of the MRE 202 is about 4 μm; and thickness of the MRE is about 25 nm.

From the foregoing it should be appreciated that a planar magnetic head has been invented for high density recording. The head exhibits a low magnetic leakage loss and a high signal-to-noise ratio. The invention has a substantially symmetrical cross-track response. It is also substantially immune to the stray magnetic flux in its vicinity. Thus, the magnetic head does not require magnetic shielding from the stray flux. The MRE or GMRE is positioned away from the ABS to significantly protect it from wear and corrosion. Examples of MRE and GMRE are described for the magnetic head; other high sensitivity materials are also applicable for the present invention.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

I claim:

1. A planar magnetic head for reading and writing information to a magnetic medium, the head comprising a gap structure coupled to a substrate, the structure comprising:

a first ferromagnetic lip adjacent to a head gap, the part of the lip facing the gap having a substantially flat surface with a thickness, the head gap having a gap length;

a first and a second ferromagnetic pole, the first pole being connected to the first lip, the first and second poles being separated by a distance greater than the gap length, and each pole having a thickness greater than the thickness of the lip; and a Magnetoresistive element (MRE) connecting the first and second poles at a location where the first and second poles are separated by a distance greater than the gap length, the MRE being electrically isolated from the first and second poles;

wherein:

the first pole has a longitudinal axis that is substantially parallel to the medium when the head is reading and writing information to the medium;

the first lip extends from the first pole along the longitudinal axis;

the thickness of each pole is greater than the thickness of the lip along the direction that is substantially perpendicular to the longitudinal axis;

a current flows in the MRE along the direction substantially parallel to the longitudinal axis while the head reads information from the medium;

the lip, the gap, the first and second poles and the MRE are all formed on the substrate; and the magnetic head is planar, with the lip, the gap length, the first and second poles and the MRE all being substantially parallel to the medium when the head is reading or writing information to the medium.

2. A magnetic head as recited in claim 1 further comprising a ferromagnetic yoke coupled to the substrate, the yoke having a first end, the first end being separated from the first pole by a first side gap.

3. A magnetic head as recited in claim 2 wherein the yoke further comprises a second end, the second end being separated from the second pole by a second side gap.

4. A magnetic head as recited in claim 3 wherein: the magnetic head has a cross-track direction; and the MRE is a Giant Magnetoresistive element.

5. A magnetic head as recited in claim 2:

wherein the magnetic head reads and writes information in the magnetic medium;

and further comprises a bias current flowing in a coil that is coupled to the magnetic head for canceling remanence left in the yoke from writing information in the magnetic medium.

6. A magnetic head as recited in claim 2 wherein: the magnetic head has a cross-track direction; and the MRE is a Giant Magnetoresistive element.

7. A magnetic head as recited in claim 1 further comprising:

a sense current:

wherein:

the magnetic head has a cross-track direction; and the MRE has two magnetoresistive films, each film having an easy axis pointing substantially along the cross-track direction, the two magnetoresistive films being separated by a non-magnetic film, with the sense current substantially perpendicular to the easy axes of the two magnetoresistive films.

8. A magnetic head as recited in claim 7 further comprising:

a yoke;

a write current generating magnetic field that is coupled to the magnetic head for writing information on the magnetic medium; and a bias current generating another magnetic filed that is coupled to the magnetic head with a part of the bias current canceling remanence left in the yoke from writing information on the magnetic medium.

9. A magnetic head as recited in claim 7 wherein the sense current flows in the MRE, after the activation and during the termination of writing information on the magnetic medium.

10. A magnetic head as recited in claim 1 further comprising a second lip, the second lip being connected to the second ferromagnetic pole, the first and second lips defining the head gap.

11. A magnetic head as recited in claim 10 wherein: the magnetic head has a cross-track direction; and the MRE is a Giant Magnetoresistive element.

12. A magnetic head as recited in claim 1 wherein:

the magnetic head has a cross-track direction; and the MRE has an easy axis pointing along an acute angle from the cross-track direction.

13. A magnetic head as recited in claim 1 wherein each ferromagnetic pole includes one or more notches to extend the distance between the first and second poles.

14. A magnetic head as recited in claim 1 wherein:

the MRE has an active length; and each ferromagnetic pole includes one or more notches to further increase the separation between the first and second poles, thereby increasing the active length of the MRE.

15. A magnetic head as recited in claim 1 wherein: the magnetic head has a cross-track direction; and the MRE is a Giant Magnetoresistive Element.

16. A magnetic head as recited in claim 1:

wherein the MRE has a first end and a second end; and further comprising a first and a second ferromagnetic lead, the first and the second lead electrically connected to the first and the second end respectively.

17. A planar magnetic head for reading and writing information to a magnetic medium, the head comprising a gap structure coupled to a substrate, the structure comprising:

a first ferromagnetic lip adjacent to a head gap, the part of the lip facing the gap having a substantially flat surface with a thickness, the head gap having a gap length;

a first and a second ferromagnetic pole, the first pole bg connected to the first lip, the first and second poles being separated by a distance greater than the gap length, and each pole having a thickness greater than the thickness of the lip;

a Magnetoresistive element (MRE) connecting the first and second poles at a location where the first and second poles are separated by a distance greater than the gap length, the MRE having a first end and a second end, and the MRE being electrically isolated from the first and second poles;

a first and a second ferromagnetic lead, the first and the second lead electrically connected to the first and the second end of the MRE respectively;

a first thin non-ferromagnetic film between the first ferromagnetic lead and the MRE; and a second thin non-ferromagnetic film between the second ferromagnetic lead and the MRE wherein:

the lip, the gap, the first and second poles and the MRE are all formed on the substrate; and the magnetic head is planar, with the lip, the gap length, the first and second poles and the MRE all being substantially parallel to the medium when the head is reading or writing information to the medium.

* * * * *